United States Patent Office 3,738,949
Patented June 12, 1973

3,738,949
PINHOLE RESISTANT NYLON FILM
Elliott A. Schonberg, East Orange, and Geza Pap, Irvington, N.J., assignors to Allied Chemical Corporation, New York, N.Y.
No Drawing. Continuation of application Ser. No. 47,123, June 17, 1970, which is a continuation-in-part of application Ser. No. 746,766, July 23, 1968, now abandoned. This application Feb. 18, 1972, Ser. No. 227,646
Int. Cl. C08g 51/56, 51/62
U.S. Cl. 260—18 N    3 Claims

ABSTRACT OF THE DISCLOSURE

A self-supporting, pinhole resistant polycaproamide film comprising polyepsilon caprolactam resin having a water content of 0.04 to 0.12% by weight, epsilon caprolactam monomer present in an amount of 4 to 6% by weight, and heat stabilizer comprising 40 to 50 p.p.m. cupric chloride and 0.20 to 0.30% by weight potassium iodide.

CROSS-REFERENCE TO RELATED APPLICATIONS

This is a continuation of application Ser. No. 47,123, filed June 17, 1970, now abandoned, which in turn is a continuation-in-part of application Ser. No. 746,766, filed July 23, 1968, now abandoned.

BACKGROUND OF THE INVENTION

This invention relates to heat stabilized, film forming polycaproamide resins which form substantially pinhole resistant films. More particularly, the instant invention relates to a pin-hole resistant film forming polycaproamide resin wherein the content of water extractable constituents is between 4 and 6% by weight.

It has been recognized that polycaproamide films may be used to substantial advantage, for example, in the fabrication of metal-bonded honeycomb sections for aircraft and in vacuum bag molding of fiber glass reinforced structures. Polycaproamide films applied to these purposes must exhibit suitable heat stability, high elongation, resistance to puncture and pinholing, water-insolubility, resistance to flex-cracking and stress-cracking adhesion to sealants, low shrinkage, high abrasion-resistance.

Metal-bonding, as herein used in the specification and claims, is integrally related to the preparation of skin sections for aircraft. These skin sections are thin sheets of aluminum adhesive laminated to one or both sides of a honeycomb reinforcement, wherein typical adhesive systems used are epoxy, nylon epoxy, nitrile phenolic, vinyl phenolic, and epoxy phenolic. Metal-bonding set-ups are usually laid out on a large flat table and then covered with a vacuum "blanket" of plastic, the blanket being sealed to the table with a putty type mastic. Generally, a vacuum is then drawn on the blanket and the entire composite is placed in an autoclave at pressures up to about 75 p.s.i., and temperatures up to about 400° F. for curing cycles as long as about 4 hours.

Polycaproamide films suitable for vacuum bag molding applications are generally applied to the production of reinforced plastic parts. Usually, a lay-up comprised of a combination of reinforcing material and uncured resin is placed in the mold and within the vacuum bag. A vacuum is drawn on the bag, whereupon atmospheric pressure forces entrapped air and excess resin out of the lay-up. The molded unit is then cured for as much as about 4 hours at a temperature of about 350° F. Upon completion of this cycle the bag is opened and the final reinforced product is removed. Polycaproamide films applied to this use must draw well to conform to curvatures in the lay-up and exhibit good release properties from the molded part.

Polycaproamide films applied to the above-described uses require the successful maintenance of a vacuum within the envelope of the film enclosure in order that pressure exerted upon the outer wall of the envelope can successfully effect the desired bonding or molding. The most effective bonding or molding results would be obtained if a total vacuum was maintained under the film envelope, however, punctures and pinholes often form in the film envelope depending upon the contours of the matter contained within said envelope and the extent to which the film is handled during the operation. Therefore, it is desirable to use a film wherein the pinholding and puncturing tendencies are minimal.

In accordance with the present invention, we obtain a polycaproamide film suitable for metal-bonding and molding with greatly enhanced resistance to pinholding and puncturing, said film being formed from a monomer plasticized resin.

Other objects and advantages of our invention will become apparent from the following detailed description thereof.

SUMMARY OF THE INVENTION

Our invention involves a polycaproamide resin and pinhole resistant film produced therefrom, said resin having a content of water extractable constituents of about 4 to 6% by weight. The high monomer content in said resin results in a low viscosity resin from which a very flexible film can be produced. One method of producing said flexible film is disclosed in U.S. Pat. 3,387,068 to William C. Scudder, however, films of similarly useful quality may be produced by known blown film methods.

Our resin formulation contains water extractable constituents of between 4 and 6% by weight on the formulation, said water extractable constituents being preferably comprised of unreacted, unwashed ε-caprolactam monomer. Our formulation further contains a water content of 0.04% to 0.12%, preferably 0.10%; cupric chloride in the range of 40–50 p.p.m. and 0.20% to 0.30% by weight of potassium iodide content; the rest of the formulation being comprised of a polycaproamide, preferably ε-polycaprolactam.

The ε-caprolactam monomer contained in the resin formulation acts as a plasticizer, contributing to film flexibility, while cupric chloride and potassium iodide contribute to heat stability. When it is desirable to pelletize the resin formulation a common external lubricant for resin pellets, preferably sodium stearate, is dusted onto the pellets so as to form about 0.035% to 0.20% of the formulation by weight.

The preferred resin formulation herein defined is produced by blending two ε-polycaproamide formulations, containing the desired ingredients in varying proportions, one with a high extractable content of about 8 to 11% by weight and the other containing a low extractable content of about 1% maximum by weight.

Film produced from the preferred resin formulation was subjected to several characterization tests in an effort to find measurements which would permit evaluation of the suitability of films for vacuum bag molding and metal-bonding applications. The tensile or elastic modulus of various film samples was determined to afford a measure of stiffness; film flex-crack resistance was determined by applying a Gelbo Flex Test, wherein the film sample is subjected to 440 twist-push-pull cycles. This test was followed by a test for pinholes, which consisted of spreading said sample over a blotting surface and applying a thin coating of a discoloring agent to the film surface. A further test, the Handle-O-Meter Test, was applied to film samples, said test being a standard test used in the textile and film industry to determine the "hand" or pliability of a fabric or film.

DESCRIPTION OF THE PREFERRED EMBODIMENTS

Two preferred polycaproamide formulations which blend to produce the desired resin product are:

| Ingredients | 1 | 2 |
|---|---|---|
| Extractables, percent | [1] 1.0 | [1] 8–11 |
| Moisture, percent | [1] 0.12 | [1] 0.12 |
| Sodium stearate, percent | [1] 0.07–0.13 | |
| Cupric chloride, p.p.m. | 40–50 | 40–50 |
| Potassium iodine, percent | [1] 0.20 | [1] 0.20 |
| ε-Polycaproamide | The rest | The rest |

[1] Percentage by weight on the composition.

The percentages of extractables indicated above for formulations 1 and 2 are the maximum desirable amounts of those ingredients, whereas the percentages of moisture indicated above for formulations 1 and 2 are the maximum permissible amounts of that ingredient. However, the percentage of potassium iodide above-indicated for formulations 1 and 2 are minimum desirable amounts for that ingredient.

Films produced from the resin formulation of the instant invention were subjected to a Gelbo Flex Test in an effort to determine pinhole resistance. The Gelbo Tester consists essentially of a 3½ inch diameter stationary head and a 3½ inch diameter movable head spaced at a distance 6½ inches from face to face at the starting position of the stroke. The specimen supporting shoulders are ½ inch wide. A film sample 8 inches by 12 inches is clamped to both heads so that it forms a sleeve. The motion of the movable head is controlled by a grooved shaft to which it is attached. For testing film samples, the movable head travels 5¼ inches in each direction in such a manner as to impart a twisting motion of 270° to the sample. Flexing is run at a speed of 44 cycles per minute for a period of 10 minutes, and thereafter the sample was removed from the apparatus and spread out on wet paper toweling. The sample was then coated with stamp ink and pinholes were determined by counting the spots that penetrate through to the paper.

As a result of subjecting various film samples prepared from the resin compositions of the instant invention, to the Gelbo Flex Test it was determined that pinholing was limited to an average of about 5 pinholes per square foot. This enhanced pinhole resistance represents a significant and much desired improvement in the application of films to molding and bonding techniques.

While the present invention has been described in detail with respect to specific embodiments thereof, it is not intended that these embodiments circumscribe the invention except as it is limited by the claims.

What is claimed is:

1. A self-supporting, pinhole resistant polycaproamide film comprising polyepsilon caprolactam resin having a water content of 0.04 to 0.12% by weight, epsilon caprolactam monomer present in an amount of 4 to 6% by weight, and heat stabilizer comprising 40 to 50 p.p.m. cupric chloride and 0.20 to 0.30% by weight potassium iodide.

2. The film claimed in claim 1 including sodium stearate lubricant in the range of 0.035 to 0.20% by weight.

3. The film claimed in claim 1 including an external lubricant.

References Cited

UNITED STATES PATENTS

| 3,387,068 | 6/1968 | Scudder | 260—78 |
| 3,397,185 | 8/1968 | Tetanbaum | 260—78 |
| 3,280,053 | 10/1966 | Twilley | 260—18 |
| 3,560,606 | 2/1971 | Kuga et al. | 260—78 |
| 3,491,042 | 1/1970 | Hermann et al. | 260—18 |
| 3,425,986 | 2/1969 | Markert | 260—45.75 |
| 2,705,227 | 3/1955 | Stamatoff | 260—45.7 |
| 3,394,112 | 7/1968 | Stoll et al. | 260—78 |

DONALD E. CZAJA, Primary Examiner

E. C. RZUCIDLO, Assistant Examiner

U.S. Cl. X.R.

260—45.7 R, 45.75 C, 78 L